United States Patent
Mies

Patent Number: 5,775,359
Date of Patent: Jul. 7, 1998

[54] HYDRAULIC PRESSURE CONTROL VALVE, ESPECIALLY A HYDRAULIC POWER BRAKE VALVE

[75] Inventor: Hubert Mies, Partenstein, Germany

[73] Assignee: Mannesmann AG, Lohr/Main, Germany

[21] Appl. No.: 586,655

[22] PCT Filed: Jun. 10, 1994

[86] PCT No.: PCT/EP94/01892

§ 371 Date: Dec. 29, 1995

§ 102(e) Date: Dec. 29, 1995

[87] PCT Pub. No.: WO95/01899

PCT Pub. Date: Jan. 19, 1995

[30] Foreign Application Priority Data

Jul. 7, 1993 [DE] Germany .......................... 43 22 634.5

[51] Int. Cl.$^6$ .............................. B60I 13/14; G05D 16/10
[52] U.S. Cl. ......................................... 137/102; 137/625.69
[58] Field of Search ............................ 137/102, 625.69

[56] References Cited

U.S. PATENT DOCUMENTS

| | | | |
|---|---|---|---|
| 3,570,523 | 3/1971 | Pauliukonis | 137/102 X |
| 3,958,495 | 5/1976 | Bernhoft | 137/102 X |
| 5,123,450 | 6/1992 | Wood et al. | 137/625.69 |

FOREIGN PATENT DOCUMENTS

| | | |
|---|---|---|
| 0041020 | 12/1981 | European Pat. Off. . |
| 1956258 | 5/1971 | Germany . |
| 2737300 | 2/1978 | Germany . |
| 3039002 | 4/1982 | Germany . |
| 3127927 | 6/1982 | Germany . |
| 3545975 | 7/1987 | Germany . |
| 4117291 | 12/1992 | Germany . |
| 2051985 | 1/1981 | United Kingdom . |
| 2154027 | 8/1985 | United Kingdom . |

OTHER PUBLICATIONS

Literature: Systematik der hydraulischen Widerstandsschaltungen in Ventilen und Regelkreisen, Backe, W. In: Book series "Oilhydraulic and Pneumatic", Krausskopf-Publisher, 1974, pp. 35-39, 54, pp. 57-59.

*Primary Examiner*—Stephen M. Hepperle
*Attorney, Agent, or Firm*—Martin A. Farber

[57] ABSTRACT

A hydraulic pressure control valve, in particular a hydraulic power brake valve. A known valve of this type has, in a valve housing, a valve bore, into which, at an axial distance from each other, a supply channel, a load channel and a tank channel debouch, and a control piston which is arranged in the valve bore and which can be displaced in a first direction into a first end position defined by a stop in which the supply channel and the load channel are connected with each other and in a second direction into a second end position in which the load channel is connected with the tank channel, and which can assume a control position between them. In order to obtain a rapid build-up of pressure in the load channel down to small final pressures upon an actuation of the valve, the load channel be arranged between the supply channel and the tank channel, the control piston have a radial recess for direct connection of the consumer channel with the supply channel, and that the radial recess in the first end position of the control piston is symmetrical to the consumer channel and to the supply channel. As a result the flow forces in the first end pressure of the control piston are very slight, so that a rapid build-up of pressure is obtained.

15 Claims, 2 Drawing Sheets

HYDRAULIC PRESSURE CONTROL VALVE, ESPECIALLY A HYDRAULIC POWER BRAKE VALVE

FIELD AND BACKGROUND OF THE INVENTION

The present invention proceeds from a hydraulic pressure control valve, especially a hydraulic power brake valve.

Such a pressure control valve developed as a power brake valve is known from Federal Republic of Germany DE 35 45 975 A1. That valve has, within a valve housing, a valve bore into which a supply channel, a brake pressure channel as load pressure, and a tank channel debouch spaced axially from each other, the supply channel being arranged between the brake pressure channel and the tank channel. Furthermore, in the known power brake valve in accordance with the preamble to claim 1, the valve bore contains a control piston which is displaceable in a first direction into a first end position defined by a stop in which the supply channel and the brake pressure channel are connected to each other and in a second direction into a second end position in which the brake pressure channel and the tank channel are connected to each other. Between these positions, the control piston can assume a control position in which it separates the brake pressure channel with zero overlap or a slight positive overlap from the supply channel and the tank channel. In the known power brake valve, the control piston has a central longitudinal bore into which there debouches a transverse bore the diameter of which corresponds to the clear distance between the supply channel and the tank channel and which is located in the region between these two channels in the control position of the control piston. The longitudinal bore of the control piston is conducted in the region of the brake pressure channel by further bore again outward into a region of the control piston which is provided with a recess. Furthermore, the longitudinal bore is also open at the end of the recessed section of the control piston. Via the transverse bores and the longitudinal bores, the brake pressure channel is connected upon movement of the control piston out of the control position in the one direction to the supply channel and upon movement in the other direction to the tank channel.

In power brake systems pressures of up into the region of 100 bar are built up, depending on the external force exercised on the power brake valve. It is characteristic in this connection that a graph in which the time required for the pressure build-up is plotted against the final pressure show a region having a strong curvature. For brake pressures which are above this region, the time for the building-up of the pressure is at least approximately always the same. Below that region, the time for the building-up of the pressure increases greatly for smaller brake pressures. This is due to the fact that, on the one hand, the amount of pressure fluid flowing through the valve depends only slightly on the brake pressure which is building up and that, on the other hand, the control valve no longer enters into its first end position with the maximum cross section of flow in the case of lower final pressures. Approximately the same amount of pressure fluid must then flow through a cross section which is smaller than for higher final pressures. A rapid reaction of a hydraulic system to a control signal is generally of advantage. In particular, a rapid build-up of pressure in a brake system is favorable since in that way the safety of the persons travelling in vehicles equipped with such a brake system is increased and the feel of braking is improved.

SUMMARY OF THE INVENTION

Accordingly, the object of the invention is to develop a hydraulic pressure control valve, particularly a hydraulic power brake valve with which short times for the building up of pressure to very low final pressures can be obtained.

This object is achieved in accordance with the invention with a hydraulic pressure control valve wherein the load channel is arranged between the supply channel and the tank channel, that the control piston has a radial recess for direct connection of the load channel with the supply channel, and that in the first end position of the control piston the radial recess lies symmetrically to the brake pressure channel and to the supply channel.

The invention is based on the discovery that in a power brake valve having the features set forth in the preamble to claim 1, the influence of the forces of flow is slight in the case of high pressures which are to be built up, while at low pressures, however, it is not negligible. This has the result that at low pressures the control piston is displaced by the flow forces from its first end position which it would assume on basis of the external force exerted on it if no flow forces would occur, in the direction towards the control position, so that the maximum cross section of flow is no longer present between the supply channel and the brake pressure channel. Greater external forces to which higher end pressures correspond can, on the other hand, hold the control piston in its first end position also against the force of the flow forces so that the hydraulic liquid can flow through a maximum cross section between the supply channel and the brake pressure channel to the brake piston. With a power brake valve in accordance with the invention, due to the fact that the radial recess is symmetrical to the brake pressure channel and the supply channel in the first end position of the control piston, it is now seen to it that in the first end position, the flow forces on the control piston are zero or practically zero. Therefore, the control piston remains in its first end position down to very low final pressures until a pressure has built up in the brake pressure channel which brings the control piston into the regulating position and into an equilibrium of forces. With a power brake valve developed in accordance with the invention, it has been possible to reduce the limit down to which the time for the building-up of the pressure is approximately constant from about 40 bar to 20 bar. In hand with this, the time for the building-up of pressure has been reduced to about 80% at 40 bar down to 30% at 10 bar.

Advantageous developments of a hydraulic pressure control valve in accordance with the invention, and particularly a hydraulic power brake valve, can be noted from the dependent claims.

In principle, there are the two different possibilities with pressure control valves, namely to provide in each case a pair of control edges between the control piston and the supply channel and between the control piston and the tank channel, or to provide two pairs of control edges between the control piston and the load channel in which the pressure is to be controlled. In the first construction, a single radial recess in the control piston customarily extends between the two control edges of the control piston. In the second construction, the control piston, as indicated in claim 2, has a piston strap the axial length of which corresponds at least approximately to the axial length of the load channel and which is located in the center of the load channel in the control position of the control piston. In each case the control piston has a radial recess on both sides of the piston strap, the load channel being adapted to be connected by the one recess to a supply channel and by the other recess to the tank channel. The recess by which the consumer channel can be connected to the supply channel is now made so long axially that, it is symmetrical to the load channel and the supply channel in the first end position of the control piston.

In the case of a pressure control valve, the pressure in the load channel is returned to one end of the control piston and thereby produces a force on the control piston which opposes the external force. In accordance with a feature of the invention, this return advantageously takes place via the control piston, namely through a transverse bore in the piston strap and a longitudinal bore in the control piston, open towards one end of the control piston, into which longitudinal bore the transverse bore debouches.

The arrangement of the pairs of control edges first described above is realized in the case of a hydraulic pressure control valve in accordance with another feature of the invention. To be sure, in a hydraulic pressure control valve in accordance with the invention, there is not merely one radial recess on the control piston between its two control edges. Rather, two recesses lying axially one behind the other are provided between which there is a piston strap which leaves a cross section open between the load channel and the first recess in the positions of the control piston. This piston strap has no function with respect to the connections of the three channels to each other. It is present merely in order to produce a recess in the control piston which, in the first end position of the control piston, is symmetrical to the load channel and to the supply channel.

In order to be able to produce the connection between the load channel and the tank channel without bore holes in the control piston which are complicated to produce, it is provided, in accordance with still another feature of the invention, that the axial length of the control strap is less than the axial length of the load channel and that the piston strap leaves a cross section open between the load channel and the second recess in the positions of the control piston. Thus, the piston strap is in each case actually entirely within the load channel in the different positions of the control piston.

For the returning of the pressure in the load channel to an end of the control piston in the case of a pressure control valve it is favorable for the control piston to have, in accordance with a feature of the invention, within the second recess, a transverse bore which debouches within the control piston in a longitudinal bore which is open towards one end of the control piston. The pressure in the second recess of the control piston then corresponds to the pressure in the load channel even if the connection between the supply channel and the load channel is open and a hydraulic fluid flows from the supply channel to the load channel.

Ordinarily, the control piston extends at one end out of the valve bore and can be acted on there by an external force in the manner that the external force seeks to push it further into the valve bore. At said end of the valve bore, a seal is necessary between the control piston and the wall of the valve packing. With a hydraulic pressure control valve according to a feature of the invention, of the three channels debauching into the valve bore, the tank channel can be arranged closest to the end of the valve bore even if the external force acts into the valve bore. The seal between the tank channel and the space present outside the valve bore can easily be established, since at most a slight pressure gradient is present.

For the efficiency of a hydraulic system it is important to keep the losses of leakage oil low. For this purpose, it is provided, in accordance with another feature of the invention, that a radial recess in the control piston which serves for the direct connection of the load channel with the supply channel be limited in the circumferential direction of the control piston. In this way, in the second end position of the pressure control valve, the sealing surface between the supply channel and the load is enlarged as compared to a radial recess which extends all around insofar as the radial recess in this position of the control piston engages axially below the strap of the valve housing present between the two channels.

By a development of the invention an inequality of forces on the control piston in radial direction is avoided. In a power brake valve, a highly effective seal between the brake pressure channel as load channel and the tank channel is not as important as between the supply channel and the brake pressure channel since pressure is present in the brake pressure channel in each case only for a short time and this pressure furthermore may also be less than the pressure in the supply channel, so that slight oil losses to the tank channel occurring during the braking process are not important. Therefore, a radial recess in the control piston which serves for connecting the brake pressure channel to the tank channel can readily extend entirely around the piston.

Finally another feature of the invention refers to a hydraulic power brake valve which is intended for use in a two-circuit brake system and which therefore has a primary control piston and a secondary control piston. In accordance with this feature of the invention there is a difference between the primary control piston and the secondary control piston in the manner that a radial recess in the secondary control piston serves for the direct connection of an associated supply channel and an associated brake pressure channel is larger in axial direction than a similar radial recess in the primary control piston. In this way, tolerances in the position of the two groups of channels, in the position of the stop defining the first end position of the secondary control piston, in the length of the two control pistons, etc. are compensated for.

BRIEF DESCRIPTION OF THE DRAWINGS

With the above and other advantages in view, the present invention will become more clearly understood in connection with the detailed description of preferred embodiments, when considered with the accompanying drawings, of which.

DETAILED DESCRIPTION OF THE PREFERRED EMBODIMENTS

Figure 1:
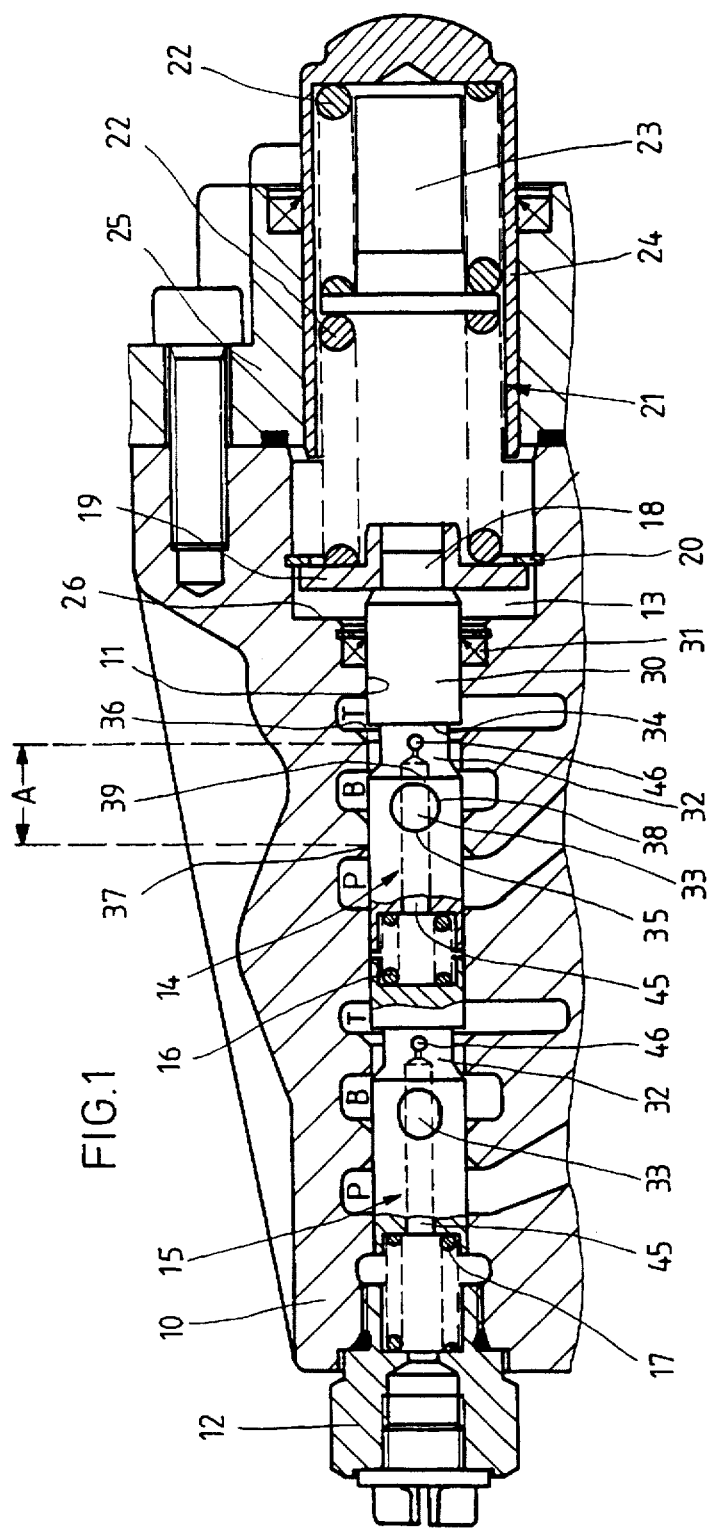
FIG. 1 is a longitudinal section through a first embodiment in which a pair of control edges are present in each case between a control piston and a supply channel and a tank channel respectively.

Referring to FIG. 1, a valve bore 11 into which two groups of channels debouch radially is present within a valve housing 10. All channels are developed as annular channels which are open towards the valve bore 11 and extend entirely around the valve bore. Each group includes a tank channel T, a brake pressure channel B and a supply channel P in which a substantially constant pressure is present. Each brake pressure channel is connected to one or more brake pistons of a motor vehicle, and the tank channel is connected to an oil supply container. A closure screw 12 closes the valve bore on the one side. On the other side, the valve bore 11 debouches into a receiving space 13 in the housing 10. In each group of, in each case, three channels, the tank channel is closest to the receiving space 13. The supply channel 6 is furthest from the receiving space 13. The brake pressure channel B is arranged between the tank channel T and the supply channel P.

Within the valve bore 11 a primary control piston 14 and a secondary control piston 15 are arranged axially one behind the other. The primary control piston 14 is contained in the half of the valve bore which adjoins the receiving space 13, and the secondary control piston 15 is arranged between the primary control piston 14 and the closure screw 12. A compression spring 16 arranged between the two control pistons 14 and 15 urges the two control pistons away from each other. Another compression spring 17 is present between the closure screw 12 and the secondary control piston 15 and exerts a force acting in the direction towards the primary control piston 14 on the secondary control piston 15. The stiffness of the spring 17 is greater than that of the spring 16. A guide pin 18 of the primary control piston 14 extends into the receiving space 13 within which a spring plate 19 is pushed over the guide pin 18. The spring plate 19 is movable axially between the step 26 between the valve bore 11 and the receiving space 13 and a snap ring 20 inserted into the receiving space. Against it rests a regulating spring arrangement 21 which consists of two coil compression springs 22 and a mandrel 23 which is clamped between the two coil compression springs. The regulating spring arrangement 21 is surrounded, over the greatest part of its length, by a sleeve 24 which is closed on the one side and which is displaceably guided in a flange 25 screwed onto the housing 10. The step as first stop, defines a first end position, while the snap ring 20, as second stop, defines a second end position of the primary control piston 14.

The primary control piston 14 has a circumferential annular groove 32 adjoining a piston section 30 in which the diameter of the piston 14 corresponds to the diameter of the valve bore 11 and on which a packing 31 held between the tank channel T and the receiving space 13 within the housing 10 rests. In the second end position of the primary control piston 14, which is shown to the right in the view of FIG. 1, the brake pressure channel B and the tank channel T are connected with each other by the annular groove 62 which in this case is considered a second radial recess of the primary control piston 14. Seen from the piston section 30 on the other side of the annular groove 32, and at a slight distance from it, the primary control piston 14 has two radial blind holes 13 diametrically opposite each other which are considered first radially recesses of the primary control piston 14. The distance between the outer edge 34 between annular groove 32 and piston section 30 and the point 35 of the upper edge 38 of a recess 33 furthest from said edge 34 is only slightly less than the distance A, indicated in FIG. 1, between the edge 36 adjacent the pressure brake channel between the tank channel and the valve bore 11 and the edge 37, adjacent the brake pressure channel B, between the supply channel P and the valve bore 11. The edges 34 and 36 form a first paid of control edges; the upper edge 38 of a recess 33 and the edge 37 form a second pair of control edges.

Figure 3:
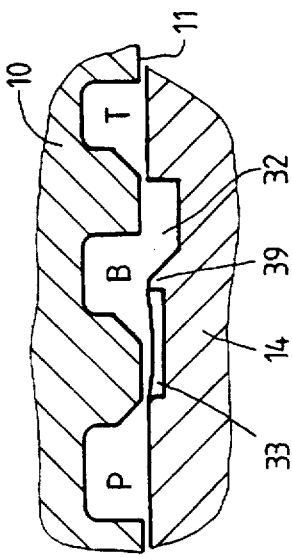
FIG. 3 is a partial section through the valve of FIG. 1, perpendicular to the plane of the drawing of FIG. 1, in which a control piston is in a control position.

In the first end position of the primary piston 14 in which the spring plate 19 rests both on the primary control piston 14 and on the step 26 between the valve bore 11 and the receiving space 13, the recesses 33 connect the supply channel P with the brake pressure channel B. In the control position of the primary control piston 14 lying between the two end positions which is shown in FIG. 3, the pairs of control edges lie radially opposite each other, the position of the point 35 being controlling with respect to the control edge 38 of the recess 33. In order to produce the connection of the brake pressure channel B on the one hand with the tank channel T and on the other hand with the supply channel P, it is not necessary, in itself, that the first recesses 33 extend only over a limited part of the circumference of the primary piston 14 and that they be separated from the annular groove 32 by the piston strap 39 formed by the material remaining between them and the annular groove 32. In order to produce the various connections, the primary control piston 14 could also have a single annular groove extending from the point 34 to the point 35.

Figure 4:
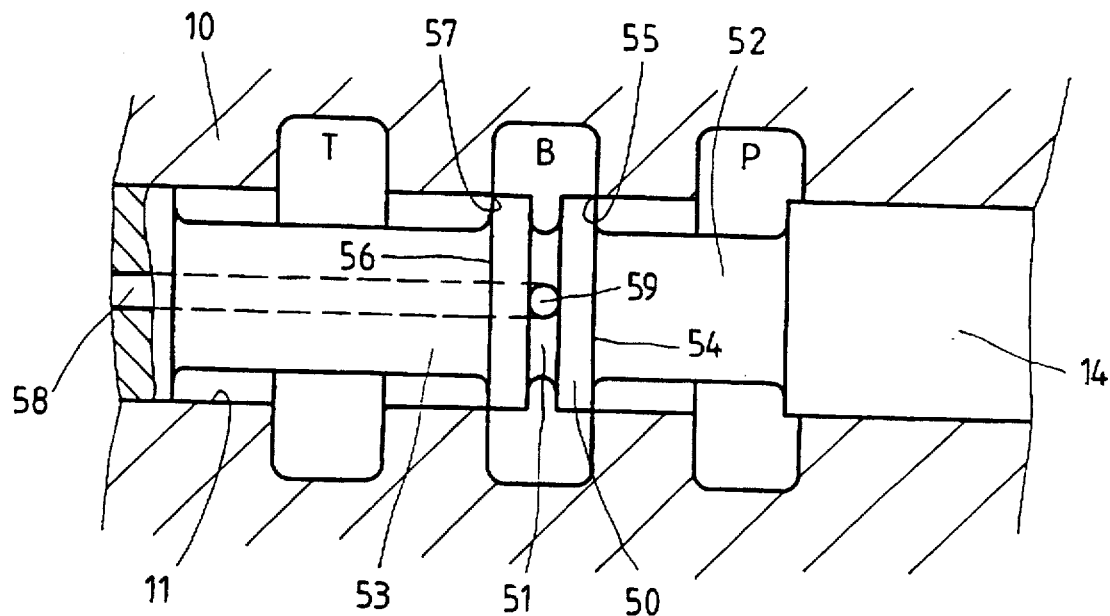
FIG. 4 shows a second embodiment of a power brake valve, in which the two pairs of control edges are developed between a piston strap and the brake pressure channel, the control piston being in the control position.

The recesses 33 are, however, limited in the circumferential direction of the primary control piston 14 in order to increase the sealing surface between the supply channel P and the brake pressure channel B and thereby permit only a slight amount of leakage oil to flow. The piston strap 39, the axial length of which is much smaller than the axial length of the brake pressure channel B, is present, in both end positions of the primary control piston 14 and in all positions between them, in each case within the brake pressure channel B and thus always leaves a connection between it and the annular groove 32 open. By the piston strap 39 the result is obtained that in the first end position of the primary control piston 14 which is shown in FIG. 4, a radial recess in the primary control piston 14, namely the recess 33, lies symmetrical to the supply channel P and the brake pressure channel B. In such a configuration, the flow forces on the primary control piston 14 are at least approximately zero. This leads to the rapid reaction time of the brake pressure even in the case of low final pressures which has already been mentioned above.

A longitudinal bore 45 is introduced into the primary control piston 14 from the end facing the secondary control piston, a transverse bore 46 extending from the annular groove 34 debauching into said longitudinal bore. Via the two bores 45 and 46 the pressure prevailing in the brake pressure channel B is returned into the space between the two control pistons in every position of the primary control piston 14. The force exerted by this pressure on the secondary control piston 15 is the input value for the height of the pressure in the second brake pressure channel B associated with the secondary control piston 15, which pressure is fed back to the end of the secondary control piston 15 remote from the primary control piston 14. The secondary control piston is developed in entirely similar manner to the primary control piston 14 with respect to the annular groove 32, the recesses 33, the longitudinal bore 45, and the transverse bore 46. The only difference is that its recesses 33 are developed slightly lengthwise in the axial direction of the secondary control piston 25, and therefore have a greater axial length than the recesses 33 of the primary control piston 14. In this way, tolerances are compensated for.

Figure 2:
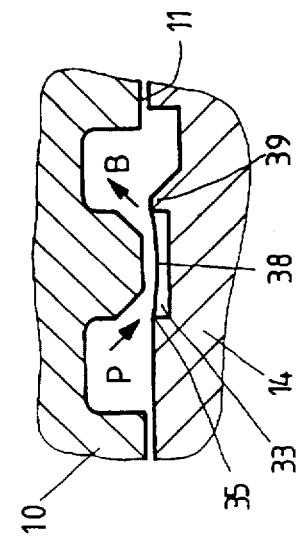
FIG. 2 is a partial section through the valve of FIG. 1, perpendicular to the plane of the drawing of FIG. 1, a control piston being in an end position in which the brake pressure channel is connected with the supply channel.

The second end position of the primary control piston 14 which is shown in FIG. 1 is defined by the snap ring 20. The second end position of the secondary control piston 15 results by equilibrium between the compression springs 16 and 17. In the second end position, the secondary control piston 15 is at a slight axial distance from the primary control piston 14. If the sleeve 24 is now pressed down to a given position to such an extent that the spring plate comes against the housing 10, then the primary control piston 14 is in its first end position, which is shown in FIG. 2. The pressure in the brake pressure channel B increases. The pressure also increases in the space between the two control pistons so that the secondary control piston 15 is pressed up to against the closure screw 14 which defines its first end position in which the recesses of the secondary control piston 15 are symmetrical to its supply channel P and brake pressure channel B. As soon as the pressures in the given position of the sleeve 24 correspond to the force of the control spring arrangement 21, the control pistons 14 and 15 are pushed into the control positions, the spring plate traveling along, and, provided that the sleeve 24 remains at rest, the external force and the pressure in the brake pressure channels increase to an end value. The pressure in the brake pressure channels B now remains at the level reached. After release of the sleeve 24 from load, the control pistons 15 return back into the second end position shown in FIG. 1 under the action of the decreasing pressures acting on them and the compression springs 16 and 17.

Figure 5:
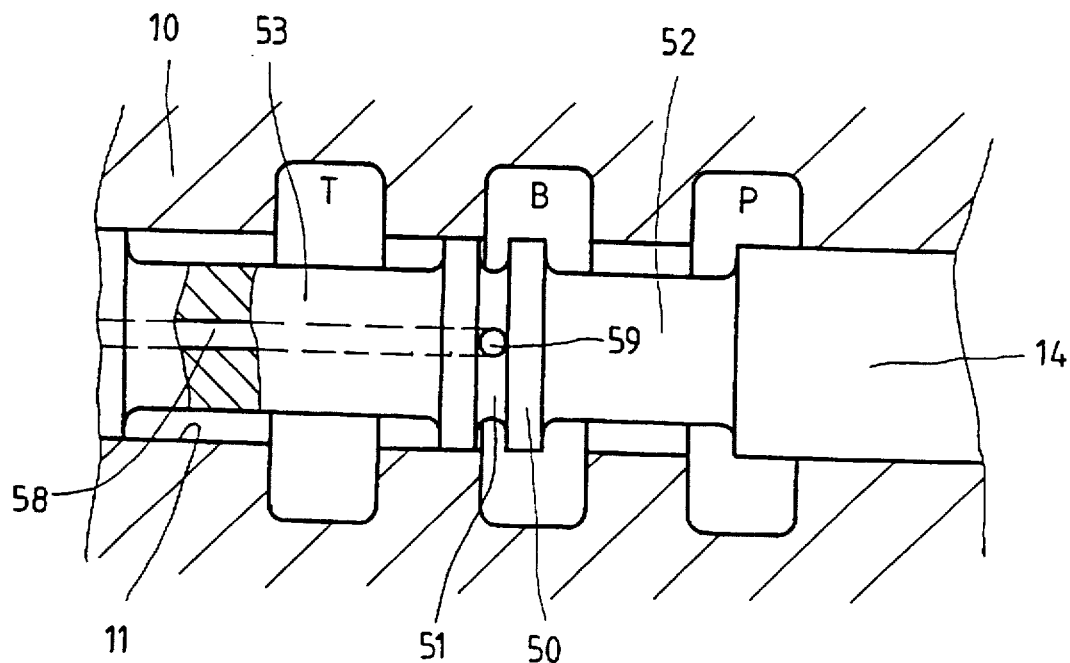
FIG. 5 shows the embodiment of FIG. 4 in an end position of the control piston in which the brake pressure channel is connected to the supply channel.

In the embodiment shown in FIGS. 4 and 5, one control piston, the control piston 14, has a piston strap 50 which corresponds in its axial length to that of the brake pressure channel B and which is interrupted centrally by a narrow annular groove 51. On the one side of the piston strap 50 there is a first annular groove 52 and on the other side of the piston strap 50 a second annular groove 53. The brake pressure channel B can be connected directly by the annular groove 52 with the supply channel P and by the annular groove 53 directly with the tank channel T. In the control position of the control piston 14 which is shown in FIG. 4, two pairs of control edges 54 and 55, and 56 and 57 respectively lie on the piston strap 50 and radially opposite each other between the brake pressure channel B and the valve bore 11. In the first end position of the valve piston 14, which is shown in FIG. 5, a connection is present between the supply channel P and the brake pressure channel B via the annular groove 52, the annular groove 52 being symmetrical to the two said channels. In this way, again, the result is obtained that in the first end position, the flow forces exerted on the control piston 14 are at least approximately zero.

In order to return the pressure in the brake pressure channel B to one end of the control piston 14, the latter has a longitudinal bore 58 which is open towards said end and a transverse bore 59 which debouches into such longitudinal bore, extending from the annular groove 51. For the reduction of the pressure in the brake pressure channel B, the control piston 14, after a release from external forces, is moved to the right as seen in FIG. 4 into a second end position, so that the brake pressure channel B is connected via the annular groove 53 with the tank channel T.

I claim:

1. A hydraulic pressure control valve, particularly a power brake valve, having a valve bore which is present in a valve housing and into which, at an axial distance from each other, a supply channel, a load channel and a tank channel open, and having a control piston which is arranged in the valve bore and which can be displaced in a first direction into a first end position defined by a stop in which the load channel is connected with the supply channel, and in a second direction into a second end position in which the load channel is connected with the tank channel and which can assume a control position between them, wherein the load channel is arranged between the supply channel and the tank channel; the control piston has a radial recess for direct connection of the load channel with the supply channel upon a positioning of the control piston adjacent a first end position of the control piston; and upon a positioning of the control piston in the first end position of the control piston, the radial recess lies symmetrical to the load channel and the supply channel; wherein said radial recess is a first radial recess, and the control piston has a second radial recess and a piston strap, the axial length of the piston strap corresponds at least approximately to the axial length of the load channel; said first radial recess and said second radial recess are present in the control piston on opposite sides of the piston strap; and the load channel can be connected with the supply channel via said first recess and with the tank channel via said second recess; and wherein the control piston is provided in the piston strap with a transverse bore which connects a longitudinal bore in the control piston, and said longitudinal bore is open towards an end of the control piston with the load channel.

2. A hydraulic pressure control valve, particularly a power brake valve, having a valve bore which is present in a valve housing and into which, at an axial distance from each other, a supply channel, a load channel and a tank channel open, and having a control piston which is arranged in the valve bore and which can be displaced in a first direction into a first end position defined by a stop in which the load channel is connected with the supply channel, and in a second direction into a second end position in which the load channel is connected with the tank channel and which can assume a control position between them, wherein the load channel is arranged between the supply channel and the tank channel; the control piston has a radial recess for direct connection of the load channel with the supply channel upon a positioning of the control piston adjacent a first end position of the control piston; and upon a positioning of the control piston in the first end position of the control piston, the radial recess lies symmetrical to the load channel and the supply channel;

wherein the radial recess is a first radial recess, and the control piston has a second radial recess, said second radial recess lying axially in front of said first radial recess;

the valve further comprises a first pair of control edges which are present between said first radial recess on the control piston and the supply channel, and a second pair of control edges which are present between said second radial recess and the tank channel; and between the two radial recesses there is a piston strap which, in the end positions of the control piston, leaves a cross section open between the load channel and the first radial recess.

3. A hydraulic pressure control valve according to claim 2, wherein the axial length of the piston strap is less than the axial length of the load channel; and the piston strap, in the positions of the control piston, leaves a cross section open between the load channel and the second recess.

4. A hydraulic pressure control valve according to claim 3, wherein the control piston, in the second recess, has a transverse bore which opens within the control piston into a longitudinal bore which is open towards one end of the control piston.

5. A hydraulic pressure control valve according to claim 2, wherein at one end of the valve bore the control piston can be acted on by an external force via a control pressure spring arrangement; and of the three channels opening into the valve bore, the tank channel is arranged closest to the end of the valve bore.

6. A hydraulic pressure control valve according to claim 2, further comprising a radial recess in the control piston which serves for the direct connection of the load channel with the supply channel is limited in the circumferential direction of the control piston.

7. A hydraulic pressure control valve according to claim 6, further comprising two identical radial recesses serving for the direct connection of the load channel with the supply channel, and being diametrically opposite each other on the control piston.

8. A hydraulic power brake valve according to claim 2, wherein within the valve bore, a primary control piston and a secondary control piston are arranged one behind the other, and that another supply channel, brake pressure channel and tank channel is associated with each control piston;

the primary control piston is acted on in a first direction by a control spring arrangement; a space between the two control pistons can be acted on by the pressure in the brake pressure channel associated with the primary control piston; the secondary control piston can be acted on by the pressure in the brake pressure channel associated therewith on the end facing away from the space; and a radial recess in the secondary control piston, which recess serves for the direct connection of an associated supply channel and brake pressure channel, is larger in axial direction than such a radial recess in the primary control piston.

9. A hydraulic pressure control valve according to claim 1, wherein at least the supply channel and the load channel extend as annular channels open towards the valve bore entirely around the valve bore.

10. A hydraulic pressure control valve according to claim 3, wherein a radial recess in the control piston which serves for direct connection of the load channel with the supply channel is limited in the circumferential direction of the control piston.

11. A hydraulic pressure control valve according to claim 10, wherein two identical radial recesses serving for the direct connection of the load channel with the supply channel are present, and are located diametrically opposite each other on the control piston.

12. A hydraulic pressure control valve according to claim 4, wherein a radial recess in the control piston which serves for direct connection of the load channel with the supply channel is limited in the circumferential direction of the control piston.

13. A hydraulic pressure control valve according to claim 12, wherein two identical radial recesses serving for the direct connection of the load channel with the supply channel are present, and are located diametrically opposite each other on the control piston.

14. A hydraulic power brake valve according to claim 3, wherein within the valve bore, a primary control piston and a secondary control piston are arranged one behind the other, and another supply channel, brake pressure channel and tank channel are associated with each control piston;

the primary control piston is acted on in a first direction by a control spring arrangement; a space between the two control pistons can be acted on by the pressure in the brake pressure channel associated with the primary control piston; the secondary control piston can be acted on by the pressure in the brake pressure channel associated therewith on the end facing away from the space; and a radial recess in the secondary control piston, which recess serves for the direct connection of an associated supply channel and brake pressure channel, is larger in axial direction than such a radial recess in the primary control piston.

15. A hydraulic power brake valve according to claim 4, wherein within the valve bore, a primary control piston and a secondary control piston are arranged one behind the other, and another supply channel, brake pressure channel and tank channel are associated with each control piston;

the primary control piston is acted on in a first direction by a control spring arrangement; a space between the two control pistons can be acted on by the pressure in the brake pressure channel associated with the primary control piston; the secondary control piston can be acted on by the pressure in the brake pressure channel associated therewith on the end facing away from the space; and a radial recess in the secondary control piston, which recess serves for the direct connection of an associated supply channel and brake pressure channel, is larger in axial direction than such a radial recess in the primary control piston.

* * * * *

UNITED STATES PATENT AND TRADEMARK OFFICE
CERTIFICATE OF CORRECTION

PATENT NO.  : 5,775,359
DATED       : July 7, 1998
INVENTOR(S) : Hubert Mies

It is certified that error appears in the above-identified patent and that said Letters Patent is hereby corrected as shown below:

On the Cover Page Item [73] Assignee: Change "Mannesmann AG" to --Mannesmann Rexroth AG--

Signed and Sealed this

Twentieth Day of October, 1998

Attest:

BRUCE LEHMAN

Attesting Officer

Commissioner of Patents and Trademarks